United States Patent [19]
Calhoun et al.

[11] Patent Number: 5,897,930
[45] Date of Patent: Apr. 27, 1999

[54] MULTIPLE EMBOSSED WEBS

[75] Inventors: Clyde D. Calhoun, Grant; David C. Koskenmaki, St. Paul, both of Minn.

[73] Assignee: Minnesota Mining and Manufacturing Company, St Paul, Minn.

[21] Appl. No.: 08/775,736

[22] Filed: Dec. 31, 1996

[51] Int. Cl.$^6$ ............................ A61F 13/02; E04F 15/16
[52] U.S. Cl. .................... 428/41.8; 428/156; 428/220
[58] Field of Search ............................ 428/42, 202, 343, 428/345, 352, 354, 40, 173, 200, 214, 906, 144, 148, 317.5, 355, 198, 156, 220, 41.8; 427/198, 199, 276, 208.6, 271; 156/209; 264/293, 294

[56] References Cited

U.S. PATENT DOCUMENTS

| | | | |
|---|---|---|---|
| 3,611,919 | 10/1971 | Thomas | 101/23 |
| 3,887,678 | 6/1975 | Lewicki, Jr. | 264/284 |
| 4,045,153 | 8/1977 | Maurino et al. | 425/440 |
| 4,320,162 | 3/1982 | Schultz | 428/154 |
| 4,551,297 | 11/1985 | Botcher et al. | 264/224 |
| 5,141,790 | 8/1992 | Calhoun et al. | 428/40 |
| 5,229,186 | 7/1993 | Tribble et al. | 428/156 |
| 5,296,277 | 3/1994 | Wilson et al. | 428/40 |
| 5,300,340 | 4/1994 | Calhoun et al. | 428/40 |
| 5,344,681 | 9/1994 | Calhoun et al. | 428/42 |
| 5,362,516 | 11/1994 | Wilson et al. | 427/207.1 |
| 5,382,464 | 1/1995 | Ruppel et al. | 428/172 |
| 5,449,540 | 9/1995 | Calhoun et al. | 428/42 |
| 5,462,765 | 10/1995 | Calhoun et al. | 427/198 |
| 5,585,178 | 12/1996 | Calhoun et al. | 428/343 |

FOREIGN PATENT DOCUMENTS

| | | |
|---|---|---|
| 1 543 977 | 4/1979 | European Pat. Off. . |
| 0 313 766 | 3/1989 | European Pat. Off. . |
| 2 055 677 | 3/1981 | United Kingdom . |
| 2 290 629 | 3/1996 | United Kingdom . |

OTHER PUBLICATIONS

Patent Abstracts of Japan for Kokai 57178718 "Embossing Apparatus" Apr. 11, 1982.

*Primary Examiner*—Lynette F. Smith
*Assistant Examiner*—Datquan Lee
*Attorney, Agent, or Firm*—Gary L. Griswold; John H. Hornickel

[57] ABSTRACT

A carrier web having at least one surface that is multiple, sequentially embossed, wherein depressions created from the prior embossing patterns(s) are preserved during the subsequent embossing pattern(s) even though the subsequent embossing pattern(s) are superimposed on the depressions from the prior embossing pattern(s). The patterns of embossing can be Euclidean or fractal created from machine tools produced using microreplication and other techniques. The carrier webs are useful for release liners for pressure sensitive adhesives and a number of other industrial and consumer applications.

12 Claims, 2 Drawing Sheets

MULTIPLE EMBOSSED WEBS

FIELD OF INVENTION

This invention relates to embossed webs useful as liners for pressure sensitive adhesives and other industrial applications.

BACKGROUND OF INVENTION

Pressure sensitive adhesives are useful for the joining of two materials. The interfaces between the adhesive and the materials are vital to the performance of the joined materials. The loss of adhesion at either interface can doom the usage of the materials.

One example of an adhesion interface requiring peak performance is a durable film displaying image graphics adhered to substrates, where the film is a backing material upon which an adhesive layer is added for adhesion to the substrate. Adhesion of a large image graphic film to substrates encounters the problem of entrapped air between the film and the substrate. Anyone who has ever attempted to hang wallpaper can appreciate the frustration that can arise when entrapped air beneath an adhesive-backed film can not be removed easily. The most common solutions to this problem are to remove and reapply the film or to perforate the film to release the entrapped air. Multiple attempts to adhere the same film to a substrate can compromise the pressure sensitive adhesive or increase the probability of uneven or misaligned film on the substrate. Perforating a film mars its appearance. The removal of air bubbles is also labor intensive.

Prior approaches have addressed facile adhesion of image graphics film to substrate by concentrating on specialized topographical constructions of the pressure sensitive adhesive. Commercially superior pressure sensitive adhesives for image graphics are available on image graphic films by 3M of St. Paul, Minn., USA. Pressure sensitive adhesives having this utility are disclosed in a variety of patents. Representative examples of patents describing such materials include U.S. Pat. Nos. 5,296,277 and 5,362,516 (both Wilson et al.) and 5,141,790 (Calhoun et al.). These patents disclose how the adhesive's topography is built from the interface between the adhesive and the release liner. The principal topographical features in the adhesive surface are isolated protrusions from the adhesive surface with identified contact areas.

SUMMARY OF INVENTION

The art needs a method of obtaining a complex pattern of embossings on a web where the complex pattern is obtained by multiple steps to permit the formation of a wide variety of material(s) in the multiple embossed webs.

One aspect of the present invention provides a solution to the problem of forming complex embossing patterns by forming a web having multiple embossed patterns.

A multiple embossed web can be used as a releasable storage liner for pressure sensitive adhesive or a transfer liner for moving pressure sensitive adhesive from one web to a substrate.

"Embossed" means a topography on a web or on tooling having an effective three-dimensional pattern that generates a difference in surface planar dimension in the liner or the tooling.

"Pattern" means any formation of embossings that can utilize any theory of geometry, including without limitation, Euclidian geometry and fractal geometry.

"Multiple embossed" means two or more embossing patterns are superimposed on the web to create a complex pattern of differing depths of embossing.

Another aspect of the present invention is a carrier web having at least one surface that is multiple, sequentially embossed, wherein depressions created from the prior embossing pattern(s) are substantially preserved during the subsequent embossing pattern(s) even though the subsequent embossing pattern(s) are superimposed on the depressions from the prior embossing pattern(s).

Although the multiple embossing steps could be combined into a single step with the design of a suitable tool or mold, the advantage of multiple steps is that the depressions formed by the prior step(s) can be filled with material prior to the subsequent embossing step(s). The number of same or different materials can be as many as the number of sequential step(s) or can be any subset of them. Once the number of same or different materials reside in the multiple embossed web, they can be removed from their multiple depth depressions for use or for further manufacturing or assembly.

A wide variety of materials can benefit from being introduced into the embossed web. Nonlimiting examples of the materials include adhesives, resins, polymers, particles, slurries, or dispersions.

When the embossed web is meant to be the final article rather than a means of continued manufacturing, the materials introduced into depressions created by a first embossing then are subjected to a subsequent embossing to form the final article. In this embodiment, liquids such as soaps, lubricants, perfumes, and abrasive slurries can fill one or more levels of the embossed depressions.

The multiple embossed webs of the present invention can provide a vast array of combinations given the multitude of embossed patterns, the multiplicity of embossings, and the variety of materials introduced into the embossed web.

While the most common multiple embossing of a carrier web is a double embossed web used as a release liner for pressure sensitive adhesives, the invention is not limited to merely double embossing. A variety of complex embossed patterns can be created to advantage for a number of industrial applications, such as:

air bleed Segmented Adhesive Transfer Tapes (SATT) (as disclosed in U.S. Pat. Nos. 5,344,681 and 5,449,540 (both Calhoun et al. and incorporated by reference herein) that are: a) positionable, b) repositionable, or c) consist of two different adhesives;

abrasives that are: a)dual shaped and b) consist of two different mineral sizes;

scouring pads;

bumped pads on flexible printed circuits;

carriers for medicaments or cosmetics;

and the like.

Another aspect of the invention is a method of embossing, comprising the steps of embossing a carrier web having at least one surface with a first pattern, to create a first pattern of depressions; embossing the surface with a second pattern, to create a second pattern of depressions; wherein the depressions created from the first embossing step are substantially preserved during the second embossing step even though the second embossing step superimposes the second pattern on the depressions created from the first embossing step.

A feature of multiple embossed webs of the present invention is that one pattern of embossing can be used for one purpose while another pattern of embossing can be used for a different purpose.

Another feature of the multiple embossed webs is the formation of a complex topography on the surface of the web that can be used as a liner for a field of pressure sensitive adhesive, a carrier for abrasive slurries used for later manufacturing, bumped pads for flexible printed circuits, or a carrier for medicaments or cosmetics.

Another feature of the multiple embossed webs is the ability to control the nature of complex topography of the web generated by the multiple embossed patterns.

Another feature of the multiple embossed webs is the ability to control the layered introduction of same or different materials into depressions of differing depths for later use or further manufacturing.

An advantage of the present invention is to create a means of sequential manufacturing of articles using different depths of depressions and same or different materials.

Another advantage of the present invention is the ability of pressure sensitive adhesive to permit fluid egress (e.g., plasticizer, exhaust gases or entrapped air) from the adhesive interface with a supporting substrate without specialized compositions or formulations of the pressure sensitive adhesive.

Another advantage of the present invention is the ability to use a variety of types of pressure sensitive adhesives while also providing an ability to "outgas" the pressure sensitive adhesive after adhesion of the web to the substrate. Included among such types of pressure sensitive adhesives are those disclosed in U.S. Pat. Nos. 5,296,277 and 5,362,516 (both Wilson et al.) and 5,141,790 (Calhoun et al.), the disclosures of which are incorporated by reference therein. An example of the use of multiple embossed webs of the present invention is as a release liner as disclosed in copending U.S. patent application Ser. No. 08/775,844 (Sher et al.) (Attorney Docket 52771USA9A) incorporated by reference herein.

Other features and advantages will become apparent from the embodiments of the invention described in relation to the following drawings.

EMBODIMENTS OF THE INVENTION

Figure 1:
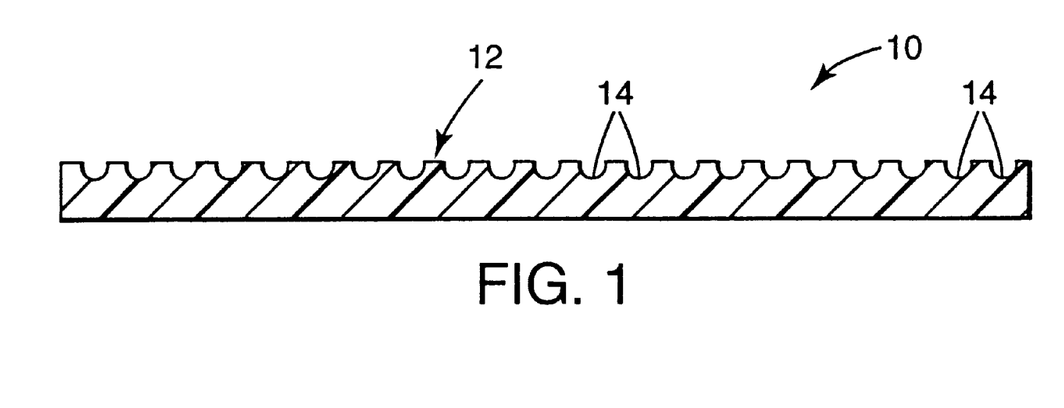
FIG. 1 is a cross-sectional view of a web after a first embossing step.
Figure 2:
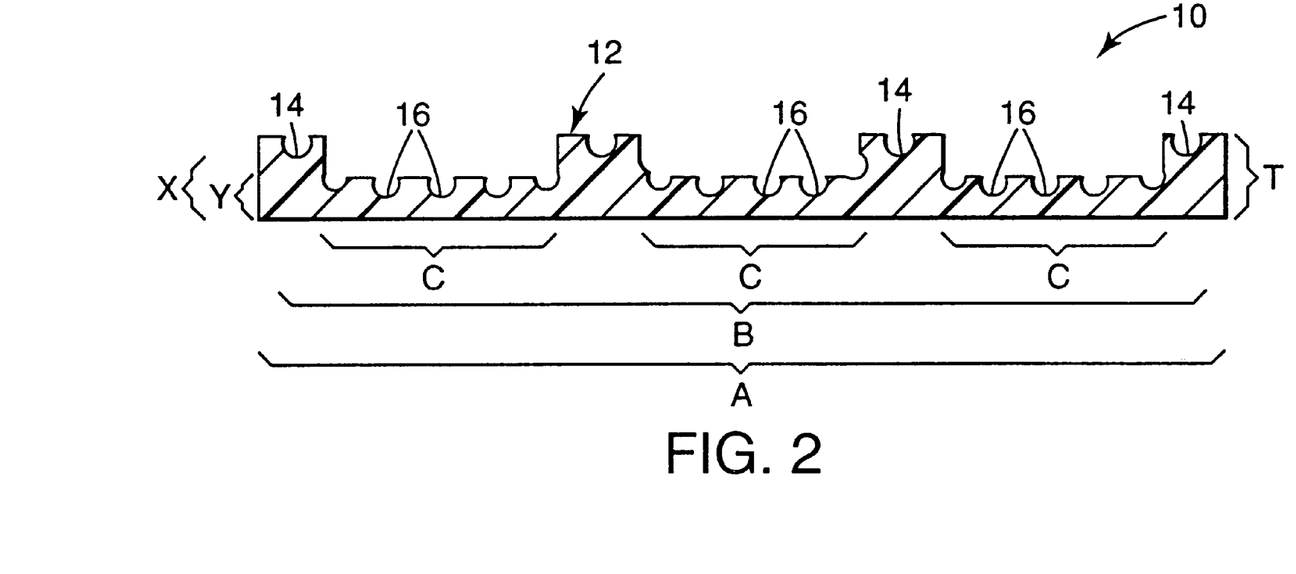
FIG. 2 is a cross-sectional view of the web of FIG. 1 after a second embossing step.

FIG. 1 depicts a web 10 having a surface 12 with one pattern 14 of embossings made according to a first embossing step of the present invention. FIG. 2 depicts that web 10 having the surface 12 (with embossing pattern 14) having been subjected to a second pattern 16 of embossings made according to the present invention.

Web 10 can be any web known to those skilled in the art that is capable of being embossed. Nonlimiting examples of webs include a variety of commercial materials from Minnesota Mining and Manufacturing Company (3M) of St. Paul, Minn. and other commercial manufacturers of liner products such as Rexam Release Corporation of Oakbrook, Ill. or Daubert Coated Products of Westchester, Ill. When webs of the invention are used as release liners, such liners are typically polyethylene coated papers with commercial silicone release coatings; polyethylene coated poly(ethylene terephthalate) films with commercial silicone release coatings; or cast polypropylene films which can be embossed with pattern(s) while making such films, and thereafter coated with commercial silicone release coatings. Additional useful liners are identified in the Calhoun et al. and Wilson et al. patents.

A multiple embossed web 10 seen in FIG. 2 can have any dimensions required for the sequential formation of a complex topography. For example, web 10 has a thickness T where there is no embossing, a thickness X caused by embossings of pattern 14, and a thickness Y caused by embossing of pattern 16. Due to conservation of material, if the planar dimensions of the web 10 do not or are not permitted to expand, embossing by pattern 14, pattern 16, or both can actually increase the thickness of the web 10 compared with original thickness T, like the formation of mountains from the movement of large land masses. For example, in copending application Ser. No. 08/775,844, (Attorney Docket 52771 USA9A), ridges can be formed from the embossing of large lands, where the ridge height exceeds the original thickness of the release liner.

Regardless of conservation of material, the percentage of thickness X to thickness T can range from about 1% to about 99%, meaning that the depth of depressions caused in surface 12 by pattern 14 can range from a minor fraction of thickness T to almost the entire original thickness T.

The percentage of thickness Y to thickness T can range from about 1% to about 99%, meaning that the depth of depressions caused in surface 12 by pattern 16 can range from a minor fraction of thickness T to almost the entire original thickness T. Further, web 10 has a total area "A", a first area "B" having depressions created during embossing of pattern 14 and an area "C" having depressions created during embossing of pattern 16. FIG. 2 shows how depressions formed in pattern 14 cover the entire surface 12 of web 10 and also reside in the larger depressions formed in pattern 16. Thus, total area A=area B, and all of area C resides within area B. However, multiple embossed webs of the present invention can have a vast variety of complex topographies according to the needs of those skilled in the art.

The percentage of B to A can range from about 1% to about 100%, meaning that surface 12 can be embossed with a pattern 14 ranging from a minor fraction of surface 12 so embossed with pattern 14 to the entire surface 12 being embossed with pattern 14.

The percentage of C to A can range from about 1% to about 100%, meaning that surface 12 can be embossed with a pattern 16 ranging from a minor fraction of surface 12 so embossed with pattern 16 to the entire surface 12 being embossed with pattern 16.

The shape of embossings for either pattern 14, pattern 16, or both, can range from a constant radius of curvature to a polygonal shape of at least 2 surfaces within the depression in web 10 causing the embossing.

The width of embossings in pattern 14, pattern 16, or both can range from about 1 $\mu$m to about 10,000 $\mu$m.

Figure 3:
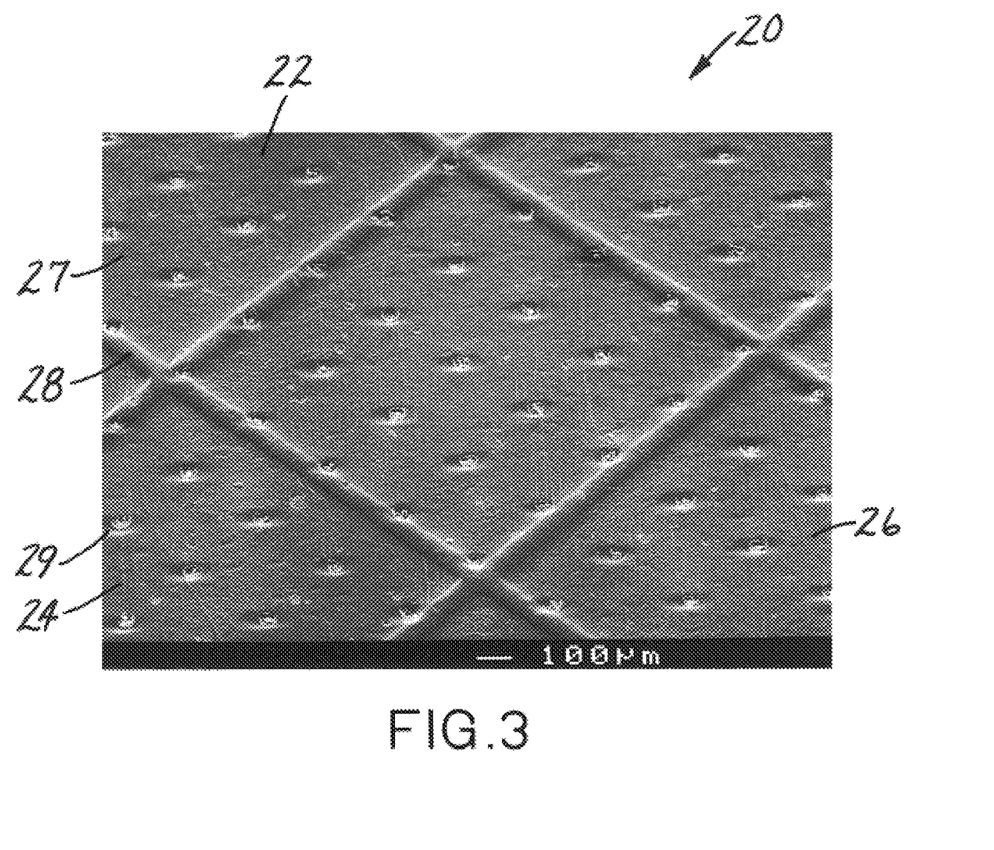
FIG. 3 is a scanning electron micrograph of a double embossed web of the present invention.

FIG. 3 shows an example of the complex topography that can be created on webs of the present invention for use as a release liner as disclosed in copending U.S. patent application Ser. No. 08/775,844 (Sher et al.) (Attorney Docket 52771USA9A) incorporated by reference herein. This scanning electron micrograph shows a liner 20 having a surface 22 with one pattern 24 of interconnected embossings and a second pattern 26 of embossings. More than two patterns can be added.

A careful viewing of FIG. 3 shows pattern 24 comprising both relatively planar lands 27, i.e., large squares that have been depressed from the initial surface 22 of liner 20 and a series of ridges 28 formed from the material moved from the lands 27 during the embossing process. Pattern 26 forms an array of depressions 29.

A sequential manufacturing process for web 10 or liner 20 determines the order of embossings. The manufacturing of the double embossed liner 20 actually requires the formation of the smaller embossing pattern 26 first, followed by the formation of the larger embossing pattern 24, second. Between the time of making the two embossing patterns, a desired material can be introduced into second embossing pattern 26, such as glass beads, in a manner as disclosed in U.S. Pat. No. 5,296,277 (Wilson et al.), incorporated by reference herein.

The resulting multiple microembossed liner 20 has a total area "A", a first area "B" for lands 27 created during embossing of pattern 24, and an area "C" for ridges 28 created during embossing of pattern 24, and an area "D" for depressions 29 residing in both lands 27 and ridges 28. FIG. 2 shows how one depression 29 can reside in a ridge 28. Thus, A=B+C and all of area D resides within either area B or C, or both.

The patterns 24 and 26 can be varied according to requirements in the art recognizing that the patterns are superimposed on one another. For example, in FIG. 3, lands 27 are discontinuous, because separate projections on the tooling for forming pattern 24 do not intersect with one another. Likewise, depressions 29 are discontinuous because separate projections on the tooling for forming pattern 26 do not intersect with one another.

The result of pattern 24 creates separated lands 27 from one another, and the result of pattern 26 creates separated depressions 29 from one another. The connected ridges 28 are a by-product of the embossing of separated lands 27.

In other words, the topography of the tool(s) is an obverse image of the final topography of the microreplicated adhesive, with the liner 20 serving as the inverse image for transferring the image of the tool(s) to the microreplicated adhesive. Therefore, the topography(ies) of the embossing tool(s) for liner 20 is essentially the topography of the microreplicated adhesive.

When a liner 20 is used to contact adhesive to obtain a topography produced from patterns 24 and 26, the percentage area of lands 27 to surface 22 (B to A) can range from about 35% to about 99%. Desirably, the percentage can range from about 50% to about 98%. Preferably, the percentage can range from about 60% to about 97%. More preferably, the percentage can range from about 70% to about 96%. Most preferably, the percentage of B to A can range from about 85% to about 95% to provide adequate fluid egress without adversely affecting adhesion to the supporting substrate. The percentage areas, respectively, of ridges 28 to surface 22 (C to A) are the remainders.

The percentage area of depressions 29 to surface 22 (D to A) can range from about 1% to about 70%. Preferably, the percentage can range from about 2% to about 25%. Most preferably, the percentage of D to A can range from about 3% to about 15% because of a balance of repositionability of the adhesive to final adhesive bond strength.

These percentages expressed with respect to the liner 20 cause approximately the same percentages on the inverted topography of an adhesive contacting the liner 20. However, as described in U.S. Pat. No. 5,296,277 (Wilson et al.), the planar adhesive surface of their pegs is important. Therefore, this invention is not limited by these percentages concerning the area of depressions 29 when creating the volume of depressions 29 or the geometry used to achieve those depressions. In other words, the depressions 29 can assume any solid geometric desired by those skilled in the art, within the percentage areas expressed above.

The embossing of pattern 24 to create lands 27 moves material into ridges 28. Like the formation of mountains from the movement of large land masses, ridges 28 rise from surface 22. While the depth of embossing of lands only results in a depth of a few micrometers, ridges rise from surface 22 to a height ranging range from about 3 to about 45 $\mu$m, preferably from about 5 to about 30 $\mu$m, and most preferably from about 6 to about 20 $\mu$m.

The depth of embossings for pattern 26 can range from about 4 to about 200 $\mu$m, preferably from about 8 to about 100 $\mu$m, and most preferably from about 10 to about 30 $\mu$m. Because the embossing of pattern 26 occurs before the embossing of pattern 24, the depths identified here are the cumulative effect of both embossings, not necessarily the height of the embossing tool.

Moreover, it should be apparent to those skilled in the art that the size of the embossing tooling needed may exceed the depth of embossing desired because of viscoelastic properties of the liner 20 being embossed.

The "sidewalls" of embossings for any of pattern 24, pattern 26, or any combination of them, can be any shape desired, ranging from a constant radius of curvature to any polygonal shape of at least 2 surfaces within the pattern 24 or 26. Nonlimiting examples of shapes of embossing, in cross-section, include curved, rectangular, trapezoidal, triangular, bimodal, and the like. U.S. Pat. No. 5,296,277 (Wilson et al.) describes some of the variables to be considered when forming depressions 29 in order to provide pegs in an adhesive.

The width of embossings in any of pattern 24, pattern 26, or any combination of them, can vary as needed. For example, in FIG. 3, the width of embossings that create lands 27 and depressions 29 are relatively uniform for surface 22. However, the pattern can vary across surface 22 for fluid egress, not unlike a tributary-river configuration in a watershed.

For example, to create microchannels for fluid egress, one could use a liner 20 having a pattern 24 creating ridges 28 having a final width, after viscoelastic properties have reached equilibrium, of less than about 200 $\mu$m and preferably from about 50 to 120 $\mu$m. The ridges 28 in FIG. 3 are about 100 $\mu$m wide.

Precision of topographical formation of web 10 or 20 can be achieved using a variety of machining techniques. The machine tool industry is capable of creating tools with any pattern desired by those skilled in the art.

Euclidean geometric patterns can be formed with any pattern of size, shape and depth of embossing projection in any number of steps.

Tools can range from planar presses to cylindrical drums to other curvilinear shapes, depending on how it is desired to employ the embossing steps.

Nonlimiting examples of sources of tooling include commercial sources of photolithographic printing plates and cylinders, precision engraved plates and cylinders, laser machined plates and cylinders, and the like.

Usefulness of the Invention

A multiple embossed web of the present invention can be used for the formation of materials that utilize the complex topography of the surface of the web. Because the multiple embossings of the web occur sequentially, material can be placed in the depressions caused by first pattern being formed before the second embossing pattern is applied.

Unexpectedly, the later embossing pattern(s) does not appreciably disrupt the earlier embossing pattern(s) in order to provide a controlled complex topography to the surface of a web.

When pressure sensitive adhesive is the desired material to be formed in the pattern(s) embossed in the web 10 or 20, such pressure sensitive adhesives can be selected from a variety of conventional adhesive formulations to achieved the meshed topography on web 10 or 20.

Nonlimiting examples of adhesives include pressure sensitive adhesives, hot melt or heat activated adhesives that are pressure sensitive at the time of application such as pressure sensitive adhesives disclosed in U.S. Pat. No. 4,994,322 (Delgado et al.); U.S. Pat. No. 4,968,562 (Delgado); EPO Publication 0 570 515; EPO Publication 0 617 708; pressure sensitive adhesives disclosed in U.S. Pat. Nos. 5,296,277 and 5,362,516 (both Wilson et al.) and 5,141,790 (Calhoun et al.) and U.S. patent application Ser. No. 08/559,037 (Keller et al.), all incorporated by reference and any other type of pressure sensitive adhesive disclosed in Satas, et al., *Handbook of Pressure Sensitive Adhesives*, 2nd Ed. (Von Nostrand Reinhold, N.Y. 1989), the disclosure of which is incorporated by reference.

When other materials such as soaps, lubricants, perfumes, abrasive slurries, or any other solution, emulsion, dispersion, or other liquid are desired to be used with webs of the present invention, one skilled in the art without departing from the scope of the present invention can readily determine the array of combinations possible, given the multitude of possible embossed patterns, the multiplicity of possible embossings, and the variety of possible materials to be introduced into the embossed carrier web operating as a transfer article or as a final article for storage of the other material. With some materials, such as soaps or perfumes, the embossed web is preferably used as the final article.

Commercially available soaps, perfumes, slurries, lubricants, and the like can be used with webs of the present invention.

Further embodiments are described in the examples.

EXAMPLES

Example 1

An embossed Controltac™ Plus liner (commercially available from 3M, St. Paul, Minn.) with empty depressions was embossed with a metal tool having 0.25 mm diameter posts that were arranged in a square lattice pattern to provide 190 posts/cm². Commercial Controltac™ Plus liners have depressions of about 50–75 µm in diameter and about 10–15 µm deep arranged in a square lattice pattern to provide 1120 depressions/cm². The depth of the second embossing was varied from a few µm to about 15 µm. Examination of the surface of the liner using scanning electron microscopy revealed depressions from the (commercial) first emboss at the bottom of the depressions produced from the second embossing. At the greater depths of the second emboss, it appeared that the diameter of the depressions from the first emboss had a slight reduction in diameter when compared to their initial size. However, the second embossing step did not remove the presence of the depressions created by the first embossing step. A multiple embossed web was formed.

Example 2

A second embossed Controltac™ Plus liner with its depressions filled with a glass bead slurry was embossed a second time with a tool having square posts 2.5 mm on a side and separated by intersecting grooves 0.38 mm wide. After the second embossing step, an adhesive tape was laminated to the surface of the liner and then delaminated for examination under an optical microscope. Clumps of glass beads were observed on the surface of the adhesive of the tape with the adhesive surface having intersecting grooves matching the pattern of the tool used in the second embossing. The resulting tape was a positionable adhesive tape with a topography of air channels after application of a tape to a substrate.

Example 3

A release liner consisting of three layers with the core being 97 microns poly(ethylene terephthalate), 21–22 microns polyethylene with a matte finish on a back side layer, and 21–22 microns polyethylene with a glossy finish on the front side with a silicone release coating on the glossy side was microembossed with small pits on the glossy silicone-coated side and the pits filled with fine glass beads according to the procedure described in U.S. Pat. No. 5,362,516. The pits were about 70 microns diameter 18–19 microns deep in a square lattice of 300 micron spacing. A second emboss pattern was imposed upon the release liner by passing the release liner between an 85 durometer silicone rubber roll and an engraved metal roll. The engraved pattern was recessed lines (micro-grooves) with dimensions about 80 microns wide and 24 microns deep. The grooves were 1.3 mm apart and formed a square grid with grooves oriented 45 degrees to the circumference of the roll. The set point temperatures were 110° C. for the silicone roll and 104° C. for the engraved roll. The rolls were forced together with about 22 N/mm nip force by air cylinders. The release liner was passed through this arrangement at about 1.6 cm/sec. This formed a pattern of continuous intersecting ridges on the glossy silicone-coated side of the release liner. The ridges had a curved top and filleted junction with the base. Average dimensions of the ridges were about 85 microns wide, 18–19 microns high, and spaced the same as the engraved pattern. The intersections of the ridges were 16–19 microns high on average. This pattern was superimposed on the first microembossed pattern and did not substantially change the first pattern, except where individual pits were raised to the top of a ridge or sheared at the side of a ridge (see FIG. 3). The liner was analyzed with time-of-flight secondary ion mass spectrometry (TOF-SIMS) using a pulsed 25 keV Ga⁺ primary ion beam, with a beam diameter of about 1 micron, rastered over an area of 400×400 microns. A uniform silicone distribution was shown over the liner both on and off the microembossed ridge areas.

An acrylic pressure sensitive adhesive solution (described as Adhesive Solution 1 in U.S. Pat. No. 5,296,277 and modified with 18.5 per hundred resin (phr) of a resin— Nirez™ 2019 from Arizona Chemical Co.) was prepared and dried at 66° C. for 10 minutes to form an adhesive film about 32 microns thick. The exposed adhesive side were laminated at room temperature to a 46 micron thick placticized, white flexible and conformable vinyl film identical to that used in 3M™ Controltac™ Plus Graphic Marking Film Series 180-10. The lamination used a Vanquisher roll laminator (Stoughton Machine and Manufacturing Co., Inc., Stoughton Wisconsin) at 200 kPa (30 psi) gauge pressure and a speed of about 2.5 cm/second to afford an essentially flat construction. After removal of the release liner the exposed pressure sensitive adhesive surface had continuous recessed micro-channels and intersections (corresponding to the micro-ridges of the removed release liner).

The pressure sensitive adhesive had an average measured channel dimensions of about 80 microns wide and about 15–18 microns deep and a uniform array of 8–12 micron high protruding mounds of glass beads corresponding to the pits on the liner.

The samples were also applied by finger pressure or by PA-1 Hand Applicator to flat substrates. Samples with the microchanneled pressure sensitive adhesive layer required no special application technique, were easily applied, and afforded evenly adhered graphic films with virtually no entrapped air bubbles. Any air pockets purposely formed by buckling the film were easily pressed out during application or after application. Air pocket elimination did not require that the air pocket be pressed as a bulge in the film to the edge of the sample (i.e., requiring pressure sensitive adhesive debond in adjacent areas as the pocket moves). The results also show that air bleed was in a lateral (X-Y dimensions) direction and did not require z-axis air dissipation through the films or lifting of the graphic film from the substrate. All samples adhered well to the substrates and showed no signs of undesired edge lifting.

In comparison, control samples were prepared from the "pit-only liner" having only embossing pattern 26 but not embossing pattern 24. The control samples required great care to prevent entrapment of many air bubbles. The trapped bubbles and pockets the control samples prepared from the "pit-only liner" could not be pressed out without lifting the graphic or pushing the pocket under the sample as it lifted.

The invention is not limited to the above embodiments. The claims follow.

What is claimed is:

1. A carrier web, comprising:
   at least one surface that has a multiple embossed pattern having a first embossed pattern and a second embossed pattern, wherein the first embossed pattern forms an array of depressions, wherein the depressions of the first embossed pattern are in the second embossed pattern, wherein the second embossed pattern comprises lands and ridges between the lands, and wherein the height of the ridges over the lands ranges from about 3 to about 45 $\mu$m.

2. The web of claim 1, wherein a depth of depressions caused in the surface by any embossing pattern can range from a minor fraction of an original thickness of web to almost the entire original thickness.

3. The web of claim 1, wherein the surface can be embossed with any pattern ranging from a minor fraction of an area of the surface to the entire area of the surface.

4. The web of claim 1, wherein a shape of embossings for any pattern can range from a constant radius of curvature to a polygonal shape of at least 2 surfaces.

5. The web of claim 1, wherein a width of embossings in any pattern can range from about 1 $\mu$m to about 10,000 $\mu$m.

6. A method of embossing, comprising the steps of:
   (a) embossing a carrier web having at least one surface with a first pattern, to create a first pattern of depressions;
   (b) embossing the surface with a second pattern, to create a second pattern of depressions comprising lands and ridges;
   wherein the depressions created from the first embossing step are substantially preserved during the second embossing step even though the second embossing step superimposes the second pattern on the depressions created by the first embossing step, and wherein the height of the ridges over the lands ranges from about 3 to about 45 $\mu$m.

7. The method of claim 6, further comprising the step of filling depressions created by the first embossing step with a material before performing the second embossing step.

8. The method of claim 7, further comprising the step of filling depressions created by the second embossing step.

9. The method of claim 6, wherein the surface can be embossed during any embossing step in an area ranging from a minor fraction of the area of the surface to the entire area of the surface.

10. The method of claim 6, wherein a shape of embossings for any embossing step can range from a constant radius of curvature to a polygonal shape of at least 2 surfaces.

11. The method of claim 6, wherein a width of embossings for any embossing step can range from about 1 $\mu$m to about 10,000 $\mu$m.

12. A method of using a web of claim 1 as a release liner for a pressure sensitive adhesive, comprising the step of filling the multiple embossed pattern with a pressure sensitive adhesive.

* * * * *

EX PARTE REEXAMINATION CERTIFICATE (6541st)
United States Patent
Calhoun et al.

(10) Number: US 5,897,930 C1
(45) Certificate Issued: Dec. 2, 2008

(54) MULTIPLE EMBOSSED WEBS

(75) Inventors: Clyde D. Calhoun, Grant, MN (US); David C. Koskenmaki, St. Paul, MN (US)

(73) Assignee: Minnesota Mining and Manufacturing Company, St. Paul, MN (US)

Reexamination Request:
No. 90/007,978, Mar. 20, 2006
No. 90/008,215, Sep. 14, 2006

Reexamination Certificate for:
Patent No.: 5,897,930
Issued: Apr. 27, 1999
Appl. No.: 08/775,736
Filed: Dec. 31, 1996

(51) Int. Cl.
*B29C 59/02* (2006.01)
*C09J 7/02* (2006.01)

(52) U.S. Cl. ............ 428/41.8; 428/156; 428/220
(58) Field of Classification Search ............ None
See application file for complete search history.

(56) References Cited

U.S. PATENT DOCUMENTS

| | | |
|---|---|---|
| 1,056,482 A | 3/1913 | Zoppa |
| 1,511,060 A | 10/1924 | Miller |
| 1,541,311 A | 6/1925 | Anderson |
| 2,196,804 A | 4/1940 | Ball |
| 2,264,628 A | 12/1941 | Engert et al. |
| 2,555,564 A | 6/1951 | Berman |
| 2,592,801 A | 4/1952 | Hanington |
| 2,667,436 A | 1/1954 | Goepfert et al. |
| RE23,843 E | 6/1954 | Oace |
| RE23,910 E | 12/1954 | Smith |
| RE24,906 E | 12/1960 | Ulrich |
| 3,033,702 A | 5/1962 | Fenselau |
| 3,036,945 A | 5/1962 | Souza |
| 3,190,178 A | 6/1965 | McKenzie |
| 3,239,478 A | 3/1966 | Harlan, Jr. |
| 3,301,741 A | 1/1967 | Henrickson et al. |
| 3,314,838 A | 4/1967 | Erwin |
| 3,331,729 A | 7/1967 | Danielson et al. |
| 3,346,105 A | 10/1967 | Nye |
| 3,386,846 A | 6/1968 | Zones |

(Continued)

FOREIGN PATENT DOCUMENTS

| | | |
|---|---|---|
| CA | 232709 | 7/1923 |
| DE | 3417746 | 11/1985 |
| DE | 3537433 | 10/1986 |
| DE | 4411562 | 2/1995 |
| EP | 88301088 | 2/1988 |
| EP | 0274875 | 7/1988 |
| EP | 0288733 | 11/1988 |
| EP | 0336431 | 10/1989 |
| EP | 175513 | 8/1990 |
| EP | 90312546 | 11/1990 |

(Continued)

OTHER PUBLICATIONS

Satas, et al., "Handbook of Pressure Sensitive Adhesives", $2^{nd}$ Edition, vonNostrand Reinhold, NY, 1989.
Neschen, "An Authority All Around The Picture", Brochure, Neschen Corporation, 1997.

*Primary Examiner*—Stephen Stein (57) ABSTRACT

A carrier web having at least one surface that is multiple, sequentially embossed, wherein depressions created from the prior embossing patterns(s) are preserved during the subsequent embossing pattern(s) even though the subsequent embossing pattern(s) are superimposed on the depressions from the prior embossing pattern(s). The patterns of embossing can be Euclidean or fractal created from machine tools produced using microreplication and other techniques. The carrier webs are useful for release liners for pressure sensitive adhesives and a number of other industrial and consumer applications.

U.S. PATENT DOCUMENTS

| | | | |
|---|---|---|---|
| 3,409,991 A | 11/1968 | Davis et al. |
| 3,413,168 A | 11/1968 | Danielson et al. |
| 3,554,835 A | 1/1971 | Morgan |
| 3,611,919 A | 10/1971 | Thomas |
| 3,615,992 A | 10/1971 | Jeffries |
| 3,616,156 A | 10/1971 | Scholl |
| 3,635,752 A | 1/1972 | Baer et al. |
| 3,741,786 A | 6/1973 | Torney |
| 3,769,114 A | 10/1973 | Weigert |
| 3,779,850 A | 12/1973 | Gerard |
| 3,802,947 A | 4/1974 | McQuade, Jr. |
| 3,814,647 A | 6/1974 | Scher et al. |
| 3,880,953 A | 4/1975 | Downey |
| 3,887,678 A | 6/1975 | Lewick, Jr. |
| 3,922,435 A | 11/1975 | Asnes |
| 3,927,706 A | 12/1975 | Davey |
| 3,935,338 A | 1/1976 | Robertson |
| 3,944,692 A | 3/1976 | Swenson |
| 3,953,639 A | 4/1976 | Lewicki, Jr. |
| 3,953,692 A | 4/1976 | Amano et al. |
| 3,989,775 A | 11/1976 | Jack et al. |
| 3,993,815 A | 11/1976 | Douek et al. |
| 3,997,702 A | 12/1976 | Schurb et al. |
| 4,023,570 A | 5/1977 | Chinai et al. |
| 4,025,159 A | 5/1977 | McGrath |
| 4,035,549 A | 7/1977 | Kennar |
| 4,037,816 A | 7/1977 | Scott |
| 4,045,153 A | 8/1977 | Maurino et al. |
| 4,053,669 A | 10/1977 | Kapasi et al. |
| 4,054,697 A | 10/1977 | Reed et al. |
| 4,075,049 A | 2/1978 | Wood |
| 4,089,731 A | 5/1978 | Lewicki, Jr. |
| 4,091,154 A | 5/1978 | Hirai |
| 4,092,198 A | 5/1978 | Scher et al. |
| 4,109,665 A | 8/1978 | Godfrey, Jr. et al. |
| 4,131,663 A | 12/1978 | Lewicki, Jr. |
| 4,136,071 A | 1/1979 | Korpman |
| 4,151,319 A | 4/1979 | Sackoff et al. |
| 4,158,073 A | 6/1979 | Schneider et al. |
| 4,163,822 A | 8/1979 | Walter |
| 4,166,152 A | 8/1979 | Baker et al. |
| 4,171,397 A | 10/1979 | Morrow |
| 4,181,752 A | 1/1980 | Martens et al. |
| 4,214,028 A | 7/1980 | Shortway et al. |
| 4,219,376 A | 8/1980 | Roman |
| 4,223,067 A | 9/1980 | Levens |
| 4,237,889 A | 12/1980 | Gobran |
| 4,287,013 A | 9/1981 | Ronning |
| 4,288,481 A | 9/1981 | Birt et al. |
| 4,289,821 A | 9/1981 | Gray, III et al. |
| 4,294,936 A | 10/1981 | Korpman |
| 4,320,162 A | 3/1982 | Schulz |
| 4,322,450 A | 3/1982 | Gray, III et al. |
| 4,325,768 A | 4/1982 | Schulz |
| 4,326,002 A | 4/1982 | Schulz |
| 4,329,385 A | 5/1982 | Banks et al. |
| 4,333,980 A | 6/1982 | Russell |
| 4,340,276 A | 7/1982 | Maffitt et al. |
| 4,343,848 A | 8/1982 | Leonard, Jr. |
| 4,374,883 A | 2/1983 | Winslow |
| 4,376,151 A | 3/1983 | Parrotta |
| 4,377,050 A | 3/1983 | Renholts |
| 4,385,951 A | 5/1983 | Pressau |
| 4,396,448 A | 8/1983 | Ohta et al. |
| 4,397,905 A | 8/1983 | Dettmer et al. |
| 4,400,422 A | 8/1983 | Smith |
| 4,415,615 A | 11/1983 | Esmay et al. |
| 4,418,110 A * | 11/1983 | May et al. .................... 428/143 |
| 4,418,120 A | 11/1983 | Kealy et al. |
| 4,427,732 A | 1/1984 | Gray, III et al. |
| 4,430,137 A | 2/1984 | Jones |
| 4,460,634 A | 7/1984 | Hasegawa |
| 4,472,480 A | 9/1984 | Olson |
| 4,517,044 A | 5/1985 | Arnold |
| 4,518,643 A | 5/1985 | Francis |
| 4,529,654 A | 7/1985 | Drum |
| 4,539,056 A | 9/1985 | Takeshita et al. |
| 4,544,590 A | 10/1985 | Egan |
| 4,546,029 A | 10/1985 | Cancio et al. |
| 4,546,037 A | 10/1985 | King |
| 4,546,900 A | 10/1985 | Lackey |
| 4,547,431 A | 10/1985 | Eckberg |
| 4,548,862 A | 10/1985 | Hartman |
| 4,551,297 A | 11/1985 | Botcher et al. |
| 4,552,615 A | 11/1985 | Amendola et al. |
| 4,554,324 A | 11/1985 | Husman et al. |
| 4,555,284 A | 11/1985 | Quella et al. |
| 4,556,595 A | 12/1985 | Ochi |
| 4,558,258 A | 12/1985 | Miyake |
| 4,568,602 A | 2/1986 | Stow |
| 4,576,850 A | 3/1986 | Martens |
| 4,587,152 A | 5/1986 | Gleichenhagen et al. |
| 4,599,265 A | 7/1986 | Esmay |
| 4,605,592 A | 8/1986 | Paquette et al. |
| 4,606,962 A | 8/1986 | Reylek et al. |
| 4,612,075 A | 9/1986 | Waugh et al. |
| 4,615,754 A | 10/1986 | Waugh et al. |
| 4,629,663 A | 12/1986 | Brown et al. |
| 4,630,891 A | 12/1986 | Li |
| 4,637,943 A | 1/1987 | Bennett |
| 4,666,751 A | 5/1987 | Pasquali et al. |
| 4,693,935 A | 9/1987 | Mazurek |
| 4,702,948 A | 10/1987 | Sieber-Gadient |
| 4,705,011 A | 11/1987 | Hibino et al. |
| 4,713,273 A | 12/1987 | Freedman |
| 4,720,325 A | 1/1988 | Rausing et al. |
| 4,726,982 A | 2/1988 | Traynor et al. |
| 4,728,380 A | 3/1988 | Jones et al. |
| 4,732,800 A | 3/1988 | Groshens |
| 4,735,837 A | 4/1988 | Miyasaka et al. |
| 4,736,048 A | 4/1988 | Brown et al. |
| 4,737,112 A | 4/1988 | Jin et al. |
| 4,737,577 A | 4/1988 | Brown |
| 4,743,488 A | 5/1988 | Jones et al. |
| 4,761,320 A | 8/1988 | Coburn, Jr. |
| 4,775,572 A | 10/1988 | Boberet et al. |
| 4,777,276 A | 10/1988 | Rasmussen et al. |
| 4,783,354 A | 11/1988 | Fagan |
| 4,814,040 A | 3/1989 | Ozawa |
| 4,818,610 A | 4/1989 | Zimmerman et al. |
| 4,822,687 A | 4/1989 | Kessel et al. |
| 4,855,170 A | 8/1989 | Darvell et al. |
| 4,859,512 A | 8/1989 | Jones et al. |
| 4,861,635 A | 8/1989 | Carpenter et al. |
| 4,873,132 A | 10/1989 | Jones et al. |
| 4,889,234 A | 12/1989 | Sorensen et al. |
| 4,894,277 A | 1/1990 | Akasaki |
| 4,902,594 A | 2/1990 | Platzer |
| 4,908,273 A | 3/1990 | Urech et al. |
| 4,912,169 A | 3/1990 | Whitmire et al. |
| 4,913,926 A | 4/1990 | Rutkowski |
| 4,930,266 A | 6/1990 | Calhoun et al. |
| 4,946,527 A | 8/1990 | Battrell |
| 4,948,663 A | 8/1990 | Hurter et al. |
| 4,952,650 A | 8/1990 | Young et al. |
| 4,965,113 A | 10/1990 | Jones et al. |
| 4,968,562 A | 11/1990 | Delgado |
| 4,978,565 A | 12/1990 | Pigneul et al. |
| 4,981,544 A | 1/1991 | Nordale |
| 4,985,342 A | 1/1991 | Muramoto et al. |
| 4,986,496 A | 1/1991 | Marentic et al. |

| Patent | Date | Inventor |
|---|---|---|
| 4,986,866 A | 1/1991 | Ohba et al. |
| 4,988,567 A | 1/1991 | Delgado |
| 4,994,322 A | 2/1991 | Delgado et al. |
| 5,008,139 A | 4/1991 | Ochi et al. |
| 5,017,255 A | 5/1991 | Calhoun et al. |
| 5,032,003 A | 7/1991 | Antes |
| 5,037,680 A | 8/1991 | Papendick et al. |
| 5,039,172 A | 8/1991 | Krieger |
| 5,051,310 A | 9/1991 | Horn et al. |
| 5,061,535 A | 10/1991 | Kreckel et al. |
| 5,073,457 A | 12/1991 | Blackwell |
| 5,079,058 A | 1/1992 | Tomiyama et al. |
| 5,080,957 A | 1/1992 | Leseman et al. |
| 5,087,494 A | 2/1992 | Calhoun et al. |
| 5,090,762 A | 2/1992 | Krieger |
| 5,091,483 A | 2/1992 | Mazurek et al. |
| 5,122,902 A | 6/1992 | Benson |
| 5,130,185 A | 7/1992 | Ness |
| 5,141,740 A | 8/1992 | Rajagopalan et al. |
| 5,141,790 A | 8/1992 | Calhoun et al. |
| 5,143,570 A | 9/1992 | Freedman |
| 5,145,544 A | 9/1992 | Leseman et al. |
| 5,147,698 A | 9/1992 | Cole |
| 5,154,956 A | 10/1992 | Fradrich |
| 5,158,557 A | 10/1992 | Noreen et al. |
| 5,169,704 A | 12/1992 | Faust et al. |
| 5,169,727 A | 12/1992 | Boardman |
| 5,192,612 A | 3/1993 | Otter et al. |
| 5,194,299 A | 3/1993 | Fry |
| 5,196,246 A | 3/1993 | Kauss et al. |
| 5,203,941 A | 4/1993 | Spain et al. |
| 5,211,597 A | 5/1993 | Scott et al. |
| 5,227,233 A | 7/1993 | Itaba et al. |
| 5,229,186 A | 7/1993 | Tribble et al. |
| 5,234,734 A | 8/1993 | Hamada |
| 5,246,762 A | 9/1993 | Nakamura |
| 5,250,253 A | 10/1993 | Battrell |
| 5,268,228 A | 12/1993 | Orr |
| 5,273,805 A | 12/1993 | Calhoun et al. |
| 5,278,271 A | 1/1994 | Miyajima et al. |
| 5,296,277 A | 3/1994 | Wilson et al. |
| 5,298,791 A | 3/1994 | Liberty et al. |
| 5,300,340 A | 4/1994 | Calhoun et al. |
| 5,304,272 A | 4/1994 | Rohrbacker et al. |
| 5,310,576 A | 5/1994 | Patel et al. |
| 5,322,731 A | 6/1994 | Callahan, Jr. et al. |
| 5,338,590 A | 8/1994 | Rodriguez |
| 5,342,469 A | 8/1994 | Bodford et al. |
| 5,344,681 A | 9/1994 | Calhoun et al. |
| 5,344,693 A | 9/1994 | Sanders |
| 5,354,597 A | 10/1994 | Capik et al. |
| 5,362,516 A | 11/1994 | Wilson et al. |
| 5,374,468 A | 12/1994 | Babinsky et al. |
| 5,382,464 A | 1/1995 | Ruppel et al. |
| 5,405,675 A | 4/1995 | Sawka et al. |
| 5,425,977 A | 6/1995 | Hopfe |
| 5,429,856 A | 7/1995 | Krueger et al. |
| 5,437,754 A | 8/1995 | Calhoun |
| 5,449,540 A | 9/1995 | Calhoun et al. |
| 5,455,103 A | 10/1995 | Hoagland et al. |
| 5,458,719 A | 10/1995 | Pau et al. |
| 5,458,983 A | 10/1995 | Wang et al. |
| 5,462,765 A | 10/1995 | Calhoun et al. |
| 5,487,929 A | 1/1996 | Rusincovitch et al. |
| 5,501,679 A | 3/1996 | Krueger et al. |
| 5,506,031 A | 4/1996 | Spain et al. |
| 5,508,084 A | 4/1996 | Reeves et al. |
| 5,529,828 A | 6/1996 | Patel et al. |
| 5,538,674 A | 7/1996 | Nisper et al. |
| 5,582,102 A | 12/1996 | Holliday |
| 5,585,178 A | 12/1996 | Calhoun et al. |
| 5,589,246 A | 12/1996 | Calhoun et al. |
| 5,591,290 A | 1/1997 | Walter et al. |
| 5,599,618 A | 2/1997 | Callahan, Jr. et al. |
| 5,607,763 A | 3/1997 | Matsuda |
| 5,623,010 A | 4/1997 | Groves |
| 5,625,006 A | 4/1997 | Callahan, Jr. et al. |
| 5,639,530 A | 6/1997 | Miron et al. |
| 5,643,668 A | 7/1997 | Calhoun et al. |
| 5,648,425 A | 7/1997 | Everaerts et al. |
| 5,650,214 A | 7/1997 | Anderson et al. |
| 5,650,215 A | 7/1997 | Mazurek et al. |
| 5,665,446 A | 9/1997 | Sundet |
| 5,676,787 A | 10/1997 | Rusincovitch et al. |
| 5,677,376 A | 10/1997 | Groves |
| 5,691,034 A | 11/1997 | Krueger et al. |
| 5,693,405 A | 12/1997 | Harvie et al. |
| 5,698,276 A | 12/1997 | Mirabitur |
| 5,718,789 A | 2/1998 | Gebhardt et al. |
| 5,719,247 A | 2/1998 | Delgado et al. |
| 5,721,086 A | 2/1998 | Emslander et al. |
| 5,787,143 A | 7/1998 | Reiss et al. |
| 5,795,636 A | 8/1998 | Keller et al. |
| 5,800,919 A | 9/1998 | Peacock et al. |
| 5,858,160 A | 1/1999 | Piacente et al. |
| 5,866,220 A | 2/1999 | Rusincovitch et al. |
| 5,871,607 A | 2/1999 | Hamilton et al. |
| 5,889,118 A | 3/1999 | Delgado et al. |
| 5,897,930 A | 4/1999 | Calhoun et al. |
| 5,906,883 A | 5/1999 | Blanc-Brude |
| 5,958,309 A | 9/1999 | Fujii et al. |
| 5,958,447 A | 9/1999 | Haralambopoulos et al. |
| 6,015,606 A | 1/2000 | Abe |
| 6,060,159 A | 5/2000 | Delgado et al. |
| 6,074,745 A | 6/2000 | Speeney |
| 6,077,560 A | 6/2000 | Moshrefzadeh et al. |
| 6,083,616 A | 7/2000 | Dressler |
| 6,123,890 A | 9/2000 | Mazurek et al. |
| 6,129,971 A | 10/2000 | Brandt et al. |
| 6,183,671 B1 | 2/2001 | Stauffacher et al. |
| 6,197,397 B1 | 3/2001 | Sher et al. |
| 6,203,885 B1 | 3/2001 | Sher et al. |
| 6,217,981 B1 | 4/2001 | Kanno et al. |
| 6,315,851 B1 | 11/2001 | Mazurek et al. |
| 6,440,880 B2 | 8/2002 | Mazurek et al. |
| 6,911,243 B2 | 6/2005 | Sher et al. |

FOREIGN PATENT DOCUMENTS

| | | |
|---|---|---|
| EP | 0429269 A1 | 5/1991 |
| EP | 0461796 | 12/1991 |
| EP | 276557 B1 | 4/1992 |
| EP | 257984 A | 5/1992 |
| EP | 0257984 | 5/1992 |
| EP | 0508722 | 10/1992 |
| EP | 0279579 | 4/1993 |
| EP | 0539099 | 4/1993 |
| EP | 0547593 | 6/1993 |
| EP | 0580981 | 2/1994 |
| EP | 0313766 | 3/1994 |
| EP | 0459059 | 7/1994 |
| EP | 609603 A1 | 8/1994 |
| EP | 411820 B1 | 9/1994 |
| EP | 0336693 | 11/1994 |
| EP | 0622431 | 11/1994 |
| EP | 0352998 | 12/1994 |
| EP | 0336431 | 1/1995 |
| EP | 0507878 | 4/1995 |
| EP | 500480 B1 | 7/1995 |
| EP | 0529546 | 8/1995 |
| EP | 0669350 | 8/1995 |
| EP | 0580981 | 11/1995 |
| EP | 0570512 | 1/1996 |

| | | | | | | |
|---|---|---|---|---|---|---|
| EP | 0479223 | 3/1996 | | JP | 5271629 | 10/1993 |
| EP | 0705894 | 4/1996 | | JP | 52029271 | 10/1993 |
| EP | 444354 B1 | 5/1996 | | JP | 5314259 | 11/1993 |
| EP | 0570515 | 6/1996 | | JP | 6096444 | 4/1994 |
| EP | 0617708 | 9/1996 | | JP | 6184502 | 7/1994 |
| EP | 439941 A | 1/1997 | | JP | 06-184502 | 7/1994 |
| EP | 521875 B1 | 5/1997 | | JP | 6193830 | 7/1994 |
| EP | 0429269 | 7/1997 | | JP | 6212131 | 8/1994 |
| EP | 647256 B | 4/1998 | | JP | 06-270043 | 9/1994 |
| EP | 0602599 | 10/1998 | | JP | 06270043 | 9/1994 |
| EP | 0784544 | 8/1999 | | JP | 7029569 | 1/1995 |
| EP | 0696603 | 10/1999 | | JP | 07090231 | 4/1995 |
| EP | 0725809 | 12/1999 | | JP | 5309885 | 5/1995 |
| EP | 0572227 | 8/2000 | | JP | 7138541 | 5/1995 |
| EP | 0683216 | 8/2000 | | JP | 7508303 | 9/1995 |
| EP | 1011955 | 4/2003 | | JP | 7278508 | 10/1995 |
| EP | 0752498 | 6/2003 | | JP | 8000030 | 1/1996 |
| GB | 1510810 | 5/1978 | | JP | 08048951 | 2/1996 |
| GB | 1511060 | 5/1978 | | JP | 2503717 | 4/1996 |
| GB | 1541311 | 2/1979 | | JP | 08100155 | 4/1996 |
| GB | 1543977 | 4/1979 | | JP | 8112305 | 5/1996 |
| GB | 2019315 | 10/1979 | | JP | 8164580 | 6/1996 |
| GB | 2055677 | 3/1981 | | JP | 8193830 | 7/1996 |
| GB | 2290629 | 1/1996 | | JP | 8225776 | 9/1996 |
| JP | 5229270 | 3/1977 | | JP | 02587198 | 3/1997 |
| JP | 53162156 | 12/1978 | | JP | 9114383 A2 | 5/1997 |
| JP | 55129477 | 10/1980 | | JP | 09114383 | 5/1997 |
| JP | 56074045 | 6/1981 | | JP | 09141812 | 6/1997 |
| JP | 57178718 | 11/1982 | | JP | 9157612 | 6/1997 |
| JP | 58144187 | 8/1983 | | JP | 9235525 | 9/1997 |
| JP | 5951966 | 3/1984 | | JP | 9235525 A1 | 9/1997 |
| JP | 59044750 | 3/1984 | | JP | 9277460 | 10/1997 |
| JP | 59-053787 | 3/1984 | | JP | 9277460 A | 10/1997 |
| JP | 59053787 | 3/1984 | | JP | 9309166 | 12/1997 |
| JP | 59078285 | 5/1984 | | JP | 10274940 | 10/1998 |
| JP | 59078285 A | 7/1984 | | JP | 11323790 | 11/1999 |
| JP | 85011156 | 3/1985 | | JP | 2001507732 | 6/2001 |
| JP | 6069623 | 5/1985 | | WO | 8504602 | 10/1985 |
| JP | 60083829 | 5/1985 | | WO | 9100945 | 1/1991 |
| JP | 59053787 | 10/1985 | | WO | 9107277 | 5/1991 |
| JP | 60204643 A1 | 10/1985 | | WO | 9115365 | 10/1991 |
| JP | 60204643 A2 | 10/1985 | | WO | 9205314 | 4/1992 |
| JP | 61254334 | 11/1986 | | WO | 9303107 | 2/1993 |
| JP | 61293281 | 12/1986 | | WO | 9301047 | 11/1993 |
| JP | 63031734 | 2/1988 | | WO | 9400525 | 1/1994 |
| JP | 63193982 | 8/1988 | | WO | 9413465 | 6/1994 |
| JP | 63223081 | 9/1988 | | WO | 9420585 | 9/1994 |
| JP | 1256583 | 10/1989 | | WO | 9511655 | 5/1995 |
| JP | 02-072328 | 3/1990 | | WO | WO 95/11655 | 5/1995 |
| JP | 2196653 | 8/1990 | | WO | 9511945 | 5/1995 |
| JP | 9038574 | 8/1990 | | WO | 9533565 | 12/1995 |
| JP | 2229875 | 12/1990 | | WO | 9533575 | 12/1995 |
| JP | 03-067043 | 3/1991 | | WO | 9611116 | 4/1996 |
| JP | 02025229 | 10/1991 | | WO | 9615715 | 5/1996 |
| JP | 3231981 | 10/1991 | | WO | 9632248 | 10/1996 |
| JP | 03231981 | 10/1991 | | WO | 9701776 | 1/1997 |
| JP | 3243677 | 10/1991 | | WO | 9718276 | 5/1997 |
| JP | 3243677 | 11/1991 | | WO | 9723577 | 7/1997 |
| JP | 2075679 | 12/1991 | | WO | 9725256 | 7/1997 |
| JP | 04031478 | 2/1992 | | WO | 9725268 | 7/1997 |
| JP | 4043034 | 2/1992 | | WO | 9726286 | 7/1997 |
| JP | 4220480 | 8/1992 | | WO | 9731077 | 8/1997 |
| JP | 3062874 | 10/1992 | | WO | 9746631 | 12/1997 |
| JP | 4301336 | 10/1992 | | WO | 9815601 | 4/1998 |
| JP | 5056938 | 3/1993 | | WO | 9816362 | 4/1998 |
| JP | 5145137 | 6/1993 | | WO | 9818878 | 5/1998 |
| JP | 05254061 | 10/1993 | | WO | 9827857 | 7/1998 |
| JP | 05254066 | 10/1993 | | WO | 9829231 | 7/1998 |
| JP | 05261867 | 10/1993 | | WO | 9829516 | 7/1998 |
| JP | 5269846 | 10/1993 | | WO | 9900271 | 1/1999 |
| JP | 05-271629 | 10/1993 | | WO | 9903414 | 1/1999 |

| WO | 9903907 | 1/1999 | WO | 0069985 | 11/2000 |
| WO | 9923020 | 5/1999 | WO | 0073082 | 12/2000 |
| WO | 9935201 | 7/1999 | WO | 0073083 | 12/2000 |
| WO | 9961321 | 12/1999 | | | |
| WO | 9965999 | 12/1999 | | | |

* cited by examiner

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 7, 8 and 12 is confirmed.

Claims 1–6 and 9–11 are cancelled.

New claims 13–18 are added and determined to be patentable.

*13. A carrier web, comprising:*
  *at least one surface that has a multiple embossed pattern having a first embossed pattern and a second embossed pattern, wherein the first embossed pattern forms an array of depressions, wherein the depressions of the first embossed pattern are in the second embossed pattern, wherein the second embossed pattern comprises lands and ridges between the lands, and wherein the height of the ridges over the lands ranges from about 3 to about 45 µm, wherein the carrier web is a release liner.*

*14. A carrier web, comprising:*
  *at least one surface that has a multiple embossed pattern having a first embossed pattern and a second embossed pattern, wherein the first embossed pattern forms an array of depressions, wherein the depressions of the first embossed pattern are in the second embossed pattern, wherein the second embossed pattern comprises lands and ridges between the lands, and wherein the height of the ridges over the lands ranges from about 3 to about 45 µm, wherein the carrier web is a polyethylene coated paper, a polyethylene coated poly (ethylene terephthalate), or a cast polypropylene.*

*15. A carrier web, comprising:*
  *at least one surface that has a multiple embossed pattern having a first embossed pattern and a second embossed pattern, wherein the first embossed pattern forms an array of depressions, wherein the depressions of the first embossed pattern are in the second embossed pattern, wherein the second embossed pattern comprises lands and ridges between the lands, and wherein the height of the ridges over the lands ranges from about 3 to about 45 µm, wherein the carrier web comprises a silicone release coating.*

*16. An article comprising*
  *a carrier web, comprising:*
    *at least one surface that has a multiple embossed pattern having a first embossed pattern and a second embossed pattern, wherein the first embossed pattern forms an array of depressions, wherein the depressions of the first embossed pattern are in the second embossed pattern, wherein the second embossed pattern comprises lands and ridges between the lands, and wherein the height of the ridges over the lands ranges from about 3 to about 45 µm; and*
  *an adhesive layer coated on the surface having the multiple embossed pattern.*

*17. The article of claim 16 wherein the adhesive is a pressure sensitive adhesive.*

*18. The article of claim 16 comprising a vinyl film on the adhesive layer opposite the carrier web.*

* * * * *